US006226558B1

United States Patent
Schneider et al.

(10) Patent No.: US 6,226,558 B1
(45) Date of Patent: May 1, 2001

(54) METHOD OF CONTROLLING THE DRIVE OF A COMPUTER-CONTROLLED CONVEYOR DEVICE

(75) Inventors: Volker Rainer Schneider, Siegen; Eckhard Schüll, Kreutzal; Udo Beewen, Siegen, all of (DE)

(73) Assignee: Siemag Transplan GmbH, Netphen (DE)

( * ) Notice: Subject to any disclaimer, the term of this patent is extended or adjusted under 35 U.S.C. 154(b) by 0 days.

(21) Appl. No.: 09/077,535

(22) PCT Filed: Dec. 2, 1996

(86) PCT No.: PCT/EP96/05343

§ 371 Date: Jan. 11, 1999

§ 102(e) Date: Jan. 11, 1999

(87) PCT Pub. No.: WO97/19889

PCT Pub. Date: Jun. 5, 1997

(30) Foreign Application Priority Data

Nov. 30, 1995 (EP) .............................. 95 118 823

(51) Int. Cl.[7] .................................. G05B 13/02
(52) U.S. Cl. .............................. 700/47; 700/280; 701/50; 706/905; 318/592; 318/602; 318/625
(58) Field of Search .................. 700/47, 280; 318/625, 318/602, 592; 414/392, 277; 701/50; 706/905

(56) References Cited

U.S. PATENT DOCUMENTS

| | | |
|---|---|---|
| 3,638,575 | 2/1972 | Griner . |
| 4,103,795 | * 8/1978 | Miller .................................. 214/621 |
| 4,258,825 | * 3/1981 | Collins .................................. 182/14 |
| 4,888,536 | * 12/1989 | Sakai et al. ........................... 318/592 |
| 5,239,248 | * 8/1993 | Shimada et al. .................. 318/568.12 |

(List continued on next page.)

FOREIGN PATENT DOCUMENTS

| | | |
|---|---|---|
| 3335402 | 4/1985 | (DE) . |
| 3803626 | 8/1989 | (DE) . |
| 19519368 | 11/1996 | (DE) . |
| 0296498 | 12/1988 | (EP) . |
| 2252295 | 8/1992 | (GB) . |

OTHER PUBLICATIONS

International Search Report, No. PCT/EP96/05343 dated Dec. 2, 1996.
English Language Abstract of Japanese 07 187 318 of Jul. 25, 1995.
"Kennfelder in der Regelungstechnik", Michael Heiss, vol. 43(1995) Aug., No. 8, pp. 363–367.

Primary Examiner—Ayaz Sheikh
Assistant Examiner—Frantz Blanchard Jean
(74) Attorney, Agent, or Firm—Brown & Wood, LLP

(57) ABSTRACT

A method of controlling the drive of computer-controlled transporting devices (2), in particular crane facilities with lifting winches and at least one mast supported on a moving frame on which are mounted shelf operator devices provided with load-carrying means and a lifting platform, and including a current control circuit (7), a drive control circuit with a speed control circuit (6), and a position control circuit (5), extend the possibilities of intervention when an instantaneous dynamic behavior of a transporting device (2) is calculated from an available data tree of a state and disruption monitor-regulator module (8) by using available measurement and setting values-containing information on a device dynamic and based on coefficient-characteristic fields, wherein the coefficient-characteristic fields incorporate structural details and/or dynamic characteristics of the transporting device and are determined by a regulator module (9) which performs an automatic self-teaching coefficient identification, proceeding from a base setting of the dynamic variable of the transporting device and an iterative approximation logarithm (10), and vibrations of the transporting device are actively damped on a basis of mathematical equations of the dynamic behavior.

6 Claims, 1 Drawing Sheet

U.S. PATENT DOCUMENTS

| | | | | |
|---|---|---|---|---|
| 5,391,038 | * | 2/1995 | Stewart | 414/392 |
| 5,403,142 | * | 4/1995 | Stewart | 414/392 |
| 5,749,693 | * | 5/1998 | Hanaya | 414/277 |
| 5,792,483 | * | 8/1998 | Siegrist et al. | 425/135 |

* cited by examiner

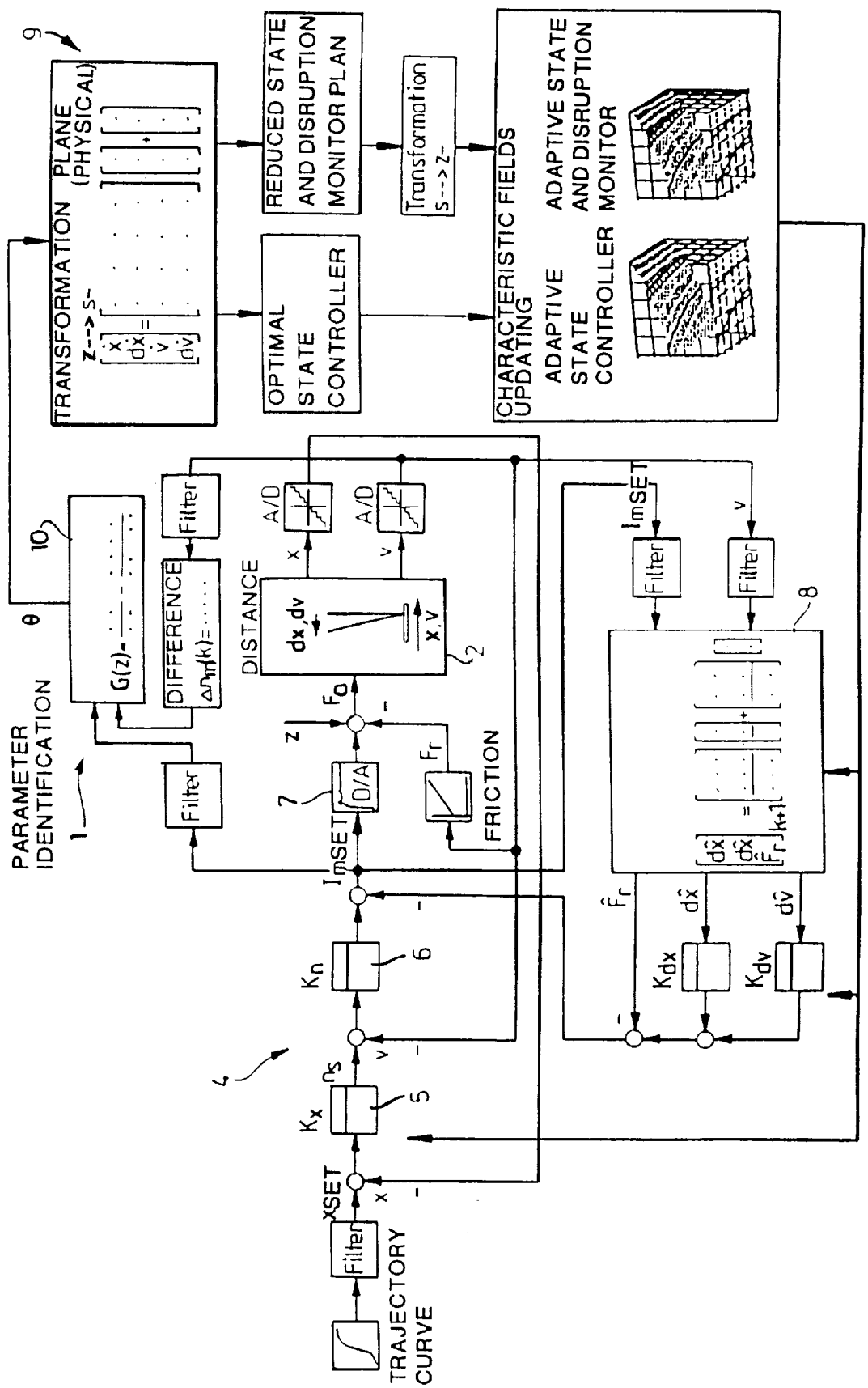

METHOD OF CONTROLLING THE DRIVE OF A COMPUTER-CONTROLLED CONVEYOR DEVICE

BACKGROUND OF THE INVENTION

The present invention relates to a method of controlling the drive of computer-controlled transporting device, in particular crane facilities with lifting winches and at least one mast supported on a moving frame on which are mounted shelf operator devices provided with load-carrying means and a lifting platform, and including a current control circuit, a drive control circuit with a speed control circuit and a position control circuit.

U.S. Pat. No. 5,239,248 discloses a control method in which the above mentioned control circuits are used and according to which the behavior of the apparatus is taken into account from an available data tree of a state and disruption monitor-regulator module using the already available measurement and setting values. Apart from the fact that only a limited number of measurement and setting values are processed, the known method deals with a pure position control.

The above-mentioned shelf operator devices or material handling equipment which, e.g., are disclosed in German Patent No. 3,803,626, are used, e.g., in logistic systems, which include as an important component a high-lift carrier, to perform completely automatically or manually a transportation task, i.e., a transfer of a unit load from a storage site to a stockyard and from their to a discharge site. The range of stored goods extends from a packing with a weight of several kilograms to heavy rolls with a weight of about 40 tons, e.g., of wound-up metal bands. The site height and the dependent thereon height of a shelf operator device is in a range from about 6 m to 45 m. The site dimensions are accessible by a freely movable or displaceable on rails shelf operator device by its travelling mechanism in the horizontal x-direction, by its lifting mechanism including a vertically displaceable lift drive on the upright mast for a lift platform, in the vertical y-direction, and by load-carrying means drive in the z-direction. High straight masts, on which the above-mentioned large load move up and down from time to time, are flexible, extremely oscillatory systems with variable dynamic characteristic which can be excited, e.g., by motive acceleration and deceleration, roadway bumps, braking and control action.

In view of the costs, power consumption and operational dependability aspect a technico-economical optimization of shelf operator devices and crane facilities, in particular of the travel and lift drives, including their controls, assumes a large importance because those, together with pure mechanical parameters, substantially affect the dynamic behavior. The object of the known control and regulation strategies is to minimize the time of loading and unloading of loads (transport units and/or goods) and to reduce the dynamic loading of structural and mechanical components of the shelf operator device or a crane facility. It is to be noted here that the normal times of the lift and travel drives include the pure movement times and the slow-down times resulting, e.g., from acceleration or braking-caused vibrations of the mast or frame and/or carrying cables. When the mast oscillates, the transfer of the load from the lift platform to a shelf cannot be carried out because of a danger of a possible damage. Rather, one should wait until the amplitude is reduced to a certain limit magnitude. From this, it can be concluded that the dynamic behavior significantly influences the throughput and, thus, the economic efficiency of a logistic system which includes a high lift carrier.

In view of the above, a throughput increase by high accelerations and speeds is excluded because the resulting therefrom large vibration amplitudes and long slow-down times are inevitable. As a result, the total time increases despite the reduction of the movement time. As a starting point for solving the existing optimization problem with contradictory objectives, one turns to drive controllers because due to the logistic definition of the problem and due to the required dimensioning, which is based on the rigidity requirements, the geometrical shape of a shelf operator device can be changed only with a great difficulty. To this end, servomotors with servo-drive amplifier, D.C. motors with power converters, and three-phase asynchronous motors with frequency converters are used as drive controllers for lift and travel drives having interface for different speed-changeable electrical drive. The interfaces limit the controllers hierarchically downward. The upward interface is obtained by the device control which provides the controller with final points of the travel movement and which is responsible for safety functions, stop functions, coordination tasks, error diagnosis, communication with the position maintaining computer, ets. An external interface connects a controller with a path measurement system which supplies the controller with an absolute or indirect measurement of an instantaneous position of the apparatus. These measurement systems are usually formed as form-locking skid-free systems or as frictionally engaged systems, which are susceptible to sliding, with a following multiple precision positioning.

Further, the so-called "3-point position control" and a "cascade control", which are formed of three different, cascade-connected control circuits, with the current control circuit as an inner circuit, and the speed control and the position control circuits as outer circuits, relate to the state-of-the art control concepts. In these control concepts, the "3-point position control," strictly speaking, is not a control at all, rather it presents a path-dependent speed control, resulting in a multi-stage deceleration process with a loss of time. Because no continuous adjustment between an actual position value and the set value takes place, the accumulated position deviations are compensated only at the end of the deceleration process during a creeping movement with a reduced speed. Thus, the multi-stage positioning brings with it multiple speed changes and thereby changes of acceleration and deceleration which stimulate the oscillation of the mast or cables of the apparatus. Contrary to this, the cascade control is characterized by a continuous comparison of the actual position value and the set position value, with the active compensation of the position deviation by adaptation of the set speed values. This concept results in few starting points for stimulating oscillations.

For minimizing the oscillation, with both control concepts, a passive process is used in which timed changes of the acceleration, and, thereby, the accompanying jolts, are limited by setting forth a suitable command variable. Thereby, a transition is made from a discrete acceleration change to a linearly increasing or sinusoidal rounding. The drawback of this oscillation reduction consists in that with rounding with retaining of maximal acceleration values, the mean acceleration decreases which results in inevitable time losses.

SUMMARY OF THE INVENTION

Accordingly, an object of the invention is a control process as described above which would permit to decisively widen the limited intervention possibilities and narrow technical limits of the conventional control concept and narrow technical limits of the conventional control concept.

This object is achieved according to the invention by calculating an instantaneous dynamic behavior of a transporting device from an available data tree of a state and disruption monitor-regulator module by using available measurement and setting values-containing information on a device dynamic and based on coefficient-characteristic fields, with the coefficient-characteristic fields incorporating structural details and/or dynamic characteristics of the transporting device and determined by a regulator module which performs an automatic self-teaching coefficient identification, proceeding from a base setting of the dynamic variables of the transporting device and an iterative approximation logarithm, and with vibrations of the transporting device being actively damped on a basis of mathematical equations of the dynamic behavior.

Thereby, a widened, self-teaching adaptive condition control is achieved by damping the vibrations taking into account the active condition of the shelf operator device, which substantially widens the spectrum of optimization possibilities. The control process integrates, in addition to the internal current control circuit, speed control circuit and the position control circuit, further information about instantaneous dynamic behavior of the shelf operator device, e.g., mast excursion and the relative speed of the mast point, and a position deviation when the form-locking toothed belt drives are used. This additional information or the dynamic variable for describing the device dynamic is obtained not with measuring means but rather is calculated with an aid of mathematical model of a state and disruption monitor-regulator module from available data, e.g., mast excursion and relative speed from the available current signal.

While the control coefficients of different control circuits according to the known control concepts have constant values and are optimally set only for a dynamic condition, the control process according to the present invention does not have constant coefficients but rather special coefficient-characteristic fields, which substantially deviate from characteristic fields generally available in control technology, e.g., from German publication "Automatizierungstechnique", v. 43, No. 8, Aug. 1, 1995, pages 363–367, and include constructive particularities and/or dynamic characteristics of the transporting device. To those relate, e.g., the number of available masts (one or two), mast stiffness, position of the load (height of the platform or cable length) and the weight of the useful load. Thus, no control parameters are measured, but data from which the control parameters are calculated. In accordance with the invention, it is taken into account that practically the coefficient depend, e.g., on the actual position of the platform the size of the useful load and other actuating variables which relate to characteristic fields. Because their determination in a critical process is not time-consuming the control module conducts an automatic self-teaching coefficient identification so that proceeding from a basic re-adjustment with the aid of the mathematical model of the shelf operator device and an iterative approximation algorithm, the characteristic fields are determined. The self-teaching mode of the control module is obtained by automatically conducting a test run with adding, in the phase of a constant run, an additional current signal as an actuating variable. The approximation algorithm calculates based on set/actual value comparison, the parameter of the transfer function which again with the aid of the mathematical model leads to the coefficient-characteristic fields. Based on this control, in an ideal case, any oscillation are prevented.

In a preferred embodiment of the invention, the actual wheel pressure of the transporting device is calculated by the state and disruption monitor-regulator model, and in the drive or speed control circuit, a drive torque or a motor current is limited to an actually possible or, if measurement acquisition of data takes place, to an expected maximum. Thereby, the effect of the dynamic of the transporting device on the wheel pressures between the running or drive wheels and the rail or the foundation is taken into account. When the wheel pressure is reduced, the driven wheels transmit smaller friction forces which, in the acceleration or deceleration phase, can result in slippage and, thereby in skid or blocking of the wheels. When the effected active vibration damping opposes this effect, monitoring of the torque enables, based on a corresponding control module, the elimination of this effect in the drive control circuit. With the aid of the state and disruption monitor-regulator module, the wheel pressure is continuously calculated, and the drive torque and/or the motor current are correspondingly changed. The advantage of the torque monitor-regulator module consists in that an instantaneous maximum corresponding to the dynamic behavior of the transporting device is transferred to the acceleration or to the braking torque.

In accordance with another embodiment of the invention the torque and/or the motor current control loop is overridden by a continuous comparison of a drive speed and the absolute speed of the transporting device, taking into account an actual covered distance determined by an absolute measurement system, and is corrected upon occurrence of motor current differences.

In this case, when deviations, e.g., as a result of slippage, occur, the controller regulates the motor current to effect a correction.

When the position deviations of the transporting device resulting from load-caused deflections from an absolute position determined by the absolute measurement system, are automatically corrected, the influence, e.g., of the eccentricity of the displaceable along the mast, platform, which is caused by constructive limitations, is compensated. The eccentricity leads, under the influence of the platform own weight and the useful load, dependent on the instantaneous height of the platform, to a static bending and, thereby, to the deviation from the position determined by the measuring system. Therefore, no fine positioning, which is difficult to execute and which requires additional time as well as leads to increased installation costs associated with sensing elements and orientation marks, is necessary. These expenses, as a result of the invention, are no more necessary, as a further control module with the aid of the state and disruption monitor-regulator module continuously calculates, taken into account actual load and the platform height as well as the corresponding deformation characteristic field, the position error and automatically corrects the position set value.

According to further development of the present invention, the power consumption is controlled dependent on actual load. With regard to the energy cost-effectiveness and the increased environmental awareness, the control process represent a strategy control module which enables to select, according to an actual load situation, a respective operational strategy resulting in a minimal energy consumption. When a high output power is necessary, the lift and travel drive are time-synchronized, i.e., the more rapid axis is adapted to the more slow axis by a reduction of the acceleration or the deceleration. If the applied throughout energy is small, the maximum energy consumption is preset by limit values of the acceleration and deceleration in accordance with an actual output and, therefore, dependent on the performed job.

According to a further development of the invention the positioning accuracy of the transporting device on different transporting units and different support means is adaptively controlled. By the integration of the position control module into the inventive control process, respective positioning tolerances are selected dependent on a respective transporting unit. Thereby, it is possible to carry out calculations for a large spectrum of stored goods with regard to their weight, dimensions and carriers. Different transporting units require, in order to insure transport, e.g., from a shelf operator device in a bin of a high shelved storage room, different position tolerances which are achieved with a position control module, with the tolerances being not higher than necessary for obtaining as small as possible normal time.

Further particularities and advantages of the invention follow from the claims and from a diagram shown in the drawing, control diagram of a self-adjusting, adaptive state controller 1 for a shelf operator device 2. The controller 1 includes a reference variable generator 3, a cascade action controller 4 with a position controller 5, a speed regulator 6 and a current controller 7. Those are connected, via corresponding control circuits, with both the shelf operator device 2 and the state and disruption monitor-regulator module 8 which with help of a methodical model, based on the available data, calculates any additional information necessary for describing the apparatus dynamic. At that, not constant coefficients but rather coefficient-characteristic fields are used, which are determined by a regulator module 9 which performs an automatic self-teaching coefficient identification, proceeding from a base setting of the variables of the transporting device 2 and an iterative approximation algorithm 10. The controller 1 advantageously combines, for eliminating the vibrations and for reducing the delay time, an active vibration damping by position control of an as rapid as possible approximation to the point of aim, an optimal inverse amplification factor of the controller, a smaller contouring error, an acceleration skid control, and higher acceleration values when no vibration excitation takes place. In addition, the self-teaching mode of the module provides for a smaller dynamic loading of the entire construction and the drive chain, an improved positioning behavior, when taking into account static and dynamic deformations of the shelf operator device, a reduced starting time, and adaptation to changed operational conditions. The control parameters can be optimized taking into account different loads, lifting heights and geometry, different, construction-dependent dynamic behavior, different drives, kind of the force transmission and different static and dynamic deformations. In addition, freely selectable, if necessary, combinable operational strategies can be effected.

What is claimed is:

1. A method of controlling the drive of computer-controlled transporting devices (2), in particular crane facilities with lifting winches and at least one mast supported on a moving frame on which are mounted shelf operator devices provided with load-carrying means and a lifting platform, and including a current control circuit (7), a drive control circuit (5), and a position control circuit (5), characterized in that an instantaneous dynamic behavior of a transporting device (2) is calculated from an available data tree of a state and disruption monitor-regulator module (8) by using available measurement and setting values-containing information on a device dynamic and based on coefficient-characteristic fields, wherein the coefficient-characteristic fields incorporate structural details and/or dynamic characteristics of the transporting device and are determined by a regulator module (9) which performs an automatic self-teaching coefficient identification, proceeding from a base setting of the dynamic variable of the transporting device and an iterative approximation logarithm (10), and vibrations of the transporting device are actively damped on a basis of methodical equations of the dynamic behavior.

2. A method as set forth in claim 1, characterized in that an actual wheel pressure is calculated by the state and disruption monitor-regulator module (8), and in the drive or speed control circuit, a drive torque or a motor current is limited to an actually possible maximum.

3. A method as set forth in claim 2, characterized in that the torque and/or the motor current control loop is overridden by a continuous comparison of a drive speed and the absolute speed of the transporting device (2), taking into account an actual covered distance determined by an absolute measurement system, and is corrected upon occurrence of motor current differences.

4. A method as set forth in one of claims 1 through 3, characterized in that position deviations of the transporting device resulting from load-caused deflections from an absolute position determined by the absolute measurement system, are automatically corrected.

5. A method as set forth in one of claims 1 through 4, characterized in that a power consumption is controlled dependent on an actual load.

6. A method as set forth in one of claims 1 through 5, characterized in that a positioning accuracy of the transporting device on different transport units and different support means is adaptively controlled.

* * * * *